United States Patent
Kantabutra (12) 
(10) Patent No.: US 6,349,317 B1
(45) Date of Patent: Feb. 19, 2002

(54) EFFICIENT RADIX-4 CORDIC VECTOR ROTATORS AND COMPUTERS OF SINE AND COSINE FUNCTIONS

(76) Inventor: Vitit Kantabutra, 5199 W. Buckskin Rd., Pocatello, ID (US) 83201

( * ) Notice: Subject to any disclaimer, the term of this patent is extended or adjusted under 35 U.S.C. 154(b) by 0 days.

(21) Appl. No.: 09/267,762

(22) Filed: Mar. 13, 1999

(51) Int. Cl.[7] ............................................. G06F 17/16
(52) U.S. Cl. ..................................... 708/441; 708/622
(58) Field of Search ................................ 708/441, 622, 708/403, 404, 405

(56) References Cited

U.S. PATENT DOCUMENTS

| | | | | |
|---|---|---|---|---|
| 3,927,312 A | * | 12/1975 | Dickinson | .................. 708/441 |
| 4,843,584 A | * | 6/1989 | Sundaramurthy | ........... 708/446 |
| 4,896,287 A | * | 1/1990 | O'Donnell et al. | ......... 708/622 |
| 5,317,753 A | * | 5/1994 | Kuenemund et al. | .......... 712/7 |
| 6,014,340 A | * | 3/2000 | Mintzer | ...................... 708/403 |

* cited by examiner

Primary Examiner—David H. Malzahn (57) ABSTRACT

An improved radix-4 CORDIC rotator iteration stage, using answer digits $\{-3, -1, 1, 3\}$ instead of the conventional choices of $\{-3, -2, -1, 0, 1, 2, 3\}$ or $\{-2, -1, 0, 1, 2\}$, thereby achieving constant magnitude amplification. The invention includes an answer digit decision module, which normally examines only a few digits of the remainder angle $\theta_{i-1}$, thereby saving time when compared to full-length comparison. Very rarely does the answer digit decision process involves examining close to all the digits of the remainder angle. When examining only a few digits of the remainder angle, the circuit takes only approximately 20% longer than a radix-2 CORDIC stage. The invented rotator stage is usable either as a pipeline stage or as a single-stage iterative circuit. For use in a pipeline, the invented stage is to be used only when only a few remainder angle bits need to be examined.

4 Claims, 5 Drawing Sheets

| i | sup rho_i(1) |
|---|---|
| 0 | .1101000011100100110100110100000001101010110011110011101011 |
| 1 | .0111011110110110110001010101001110100000111101110001110100 |
| 2 | .0011110110110110100010011000100000101010101101011010011001 |
| 3 | .0001111111110110101001010000000010111110010101100111101011 |
| 4 | .0000111111110101111101101010000000101111100101011101110101 |
| 5 | .0000011111111111101101011110101101011010110011101010101011 |
| 6 | .0000001111111111111101011001110100100101011001011000111100 |
| 7 | .0000000111111111111111011010011100111010000001110010000000 |
| 8 | .0000000011111111111111111010011110100111001101101001000010 |
| 9 | .0000000001111111111111111111011001111011010010010010101010 |
| 10 | .0000000000111111111111111111111001111100111010111011011111 |
| 11 | .0000000000011111111111111111111110110011110011100111001011 |
| 12 | .0000000000001111111111111111111111011001110011100111011001 |
| 13 | .0000000000000111111111111111111111111011001110011100111010 |
| 14 | .0000000000000011111111111111111111111111010100111011000111 |
| 15 | .0000000000000001111111111111111111111111111010110011000111 |
| 16 | .0000000000000000111111111111111111111111111111011010100111 |
| 17 | .0000000000000000001111111111111111111111111111111101101111 |
| 18 | .0000000000000000000111111111111111111111111111111111001111 |
| 19 | .0000000000000000000011111111111111111111111111111111100000 |
| 20 | .0000000000000000000000111111111111111111111111111111100100 |
| 21 | .0000000000000000000000001111111111111111111111111111100110 |
| 22 | .0000000000000000000000000011111111111111111111111111100101 |
| 23 | .0000000000000000000000000000011111111111111111111111100110 |
| 24 | .0000000000000000000000000000000011111111111111111111101000 |

FIGURE 4

| i | inf rho_i(3) |
|---|---|
| 0 | .1100000100110101110011001010100000111001101001 |
| 1 | .0111010110011001110001110111011010010011001111 |
| 2 | .0011110100100101011101101010101100110011011110 |
| 3 | .0001111110101000100101101110101010011001101101 |
| 4 | .0000111111101010001101110101010011001010110101 |
| 5 | .0000011111111110101000011001010010100001101001 |
| 6 | .0000001111111111110101000011001001011001101100 |
| 7 | .0000000111111111111010100001000101011011101101 |
| 8 | .0000000011111111111110101000010010011011101101 |
| 9 | .0000000001111111111111010100001000101010011010 |
| 10 | .0000000000111111111111110101000010001011001110 |
| 11 | .0000000000011111111111111010100001000011101011 |
| 12 | .0000000000001111111111111110101000010001111010 |
| 13 | .0000000000000111111111111111101010000100011100100 |
| 14 | .0000000000000011111111111111111010100001000111001 |
| 15 | .0000000000000001111111111111111110101000010001100011 |
| 16 | .0000000000000000111111111111111111101010000100010110 |
| 17 | .0000000000000000011111111111111111110101000010101111111 |
| 18 | .0000000000000000001111111111111111111110101000010100000 |
| 19 | .0000000000000000000100000000000000000000000000000111 |
| 20 | .0000000000000000000010000000000000000000000000010111 |
| 21 | .0000000000000000000001000000000000000000000000011001 |
| 22 | .0000000000000000000000100000000000000000000000010110 |
| 23 | .0000000000000000000000010000000000000000000000010111 |
| 24 | .0000000000000000000000001000000000000000000000010110 |

FIGURE 5

EFFICIENT RADIX-4 CORDIC VECTOR ROTATORS AND COMPUTERS OF SINE AND COSINE FUNCTIONS

FIELD OF THE INVENTION

This invention relates to vector rotators and computers of sine and cosine, especially to high-radix CORDIC vector rotators.

BACKGROUND OF THE INVENTION

Vector rotation and the computation of sine and cosine (which are reducible to vector rotation) have applications in many areas that are critical to modern technology, such as telecommunications, image processing, radar, and digital signal processing. More specifically, vector rotation is used in such diverse applications as image rotation, Fourier and other Transform computations, modulation and demodulation. For example, in the computation of Discrete Fourier Transforms (including when using the Fast Fourier Transform algorithm), many multiplications of complex numbers are called for. However, each such multiplication is actually a vector rotation, and could be done using less circuit space by using a CORDIC rotator rather than 4 real-number multipliers.

The original CORDIC family of algorithms was discovered by Volder in 1956 and published three years later in the following paper: J. E. Volder, The CORDIC Trigonometric Computing Technique, IRE Transactions on Electronic Computing, EC-8, pp. 330–334, 1959. The CORDIC computer that Voider built computed in radix-2, that is, the convergence rate was 1 bit per iteration, and was used for aircraft navigation. Volder developed algorithms using essentially the same principle for computing many different functions, with vector rotation included.

A particularly simple explanation of the basic, radix-2 CORDIC algorithm, found in Ray Andraka's paper, "A Survey of CORDIC Algorithms for FPGAs," Sixth International ACM/SIGDA Symposium on FPGA, Feb. 1998, pp. 191–200, runs as follows:

The well-known formulae for vector rotation can be rewritten as:

$$x'=\cos\theta[x-y\tan\theta] \quad (1)$$

$$y'=\cos\theta[y+x\tan\theta] \quad (2)$$

where (x, y) and (x', y') are the original and the rotated vectors, respectively, and $\theta$ is the angle of rotation.

If we restrict the rotation angles $\theta$ so that $\tan\theta=\pm 2^{-(i-1)}$, for positive integer values of i, then the multiplication by the tangent in equations (1) and (2) is reduced to a shift operation when the numbers are represented in binary. (We assume that numbers are two's complement numbers.) It turns out that all angles within a certain useful range (that is, approximately [-1.743, 1.743]) can be expressed as a weighted sum of arctans of $2^{-(i-1)}$ for some small set of contiguous positive integers i. In particular, if the weights are all ±1 then we can rotate a vector (x,y) by iteratively applying the following formula:

$$x_i = K_{i-1}[x_{i-1} - y_{i-1}d_{i-1}2^{-(i-1)}] \quad (3)$$

$$y_i = K_{i-1}[y_{i-1} + x_{i-1}d_{i-1}2^{-(i-1)}] \quad (4)$$

where $$K_{i-1} = \cos(\tan^{-1}2^{-(i-1)}) = \frac{1}{\sqrt{1+2^{-2(i-1)}}}$$

and $d_{i-1}=\pm 1$.

We will henceforth refer to the application of this formula as the $i^{th}$ iteration in radix-4 CORDIC. In radix-4 CORDIC, each iteration can be thought of as a simulation of two radix-2 iterations. Therefore we will call the first iteration "iteration number two," the second iteration "iteration number four," and, in general, the $j^{th}$ iteration "iteration number 2j."

In practice, we would like to omit the multiplication with the $K_{i-1}$ factor, in which case we would not be merely rotating the vector, but also amplifying it by a factor of $1/K_{i-1}$ in iteration i. The total gain for all iterations would be the product of all the $K_{i-1}$'s, and would be a constant for a fixed number of iterations n. As n approaches infinity, this constant gain approaches approximately 1.647. In many applications, this gain does no harm so long as it is constant. And it is a constant for a fixed n (number of iterations), so long as $d_{i-1}=\pm 1$.

To apply the above theory to an actual digital apparatus for rotating a vector by a given angle, we use what Volder, in his 1959 referred to earlier in this document, called "rotation-mode CORDIC," which requires 3 input numbers—one for each of the two components $x_0$, $y_0$ of the vector to be rotated, and a third number $\theta_0$ between -1.743 and +1.743 for the angle by which the given vector is to be rotated. The equations for the $i^{th}$ iterations for traditional, Volder-style radix-2 rotation-mode CORDIC is thus as follows:

$$x_{-1}=x_{i-1}-y_{i-1}d_{i-1}2^{-(i-1)} \quad (5)$$

$$y_{-1}=y_{i-1}+x_{i-1}d_{i-1}2^{-(i-1)} \quad (6)$$

$$\theta_{-1}=\theta_{i-1}-d_{i-1}\tan^{-1}(2^{-(i-1)}) \quad (7)$$

where $d_{i-1}=-1$ if $\theta_{i-1}<0$ and +1 otherwise.

The choice of $d_{i-1}$ at each iteration is to bring the value in the angle accumulator (which was initialized to $\theta_0$, the angle by which the vector is to be rotated) as close to 0 as possible. The idea is that after all the iterations have been performed, that angle would become 0 for the given precision at which the angle accumulator is kept. As a consequence of that angle becoming 0, the given vector will have been rotated by an amount equal to the input angle $\theta_0$. Traditionally we will need as many iterations as there are fraction bits in the angle accumulator. But in practice it is possible to go through fewer iterations, if we accept the resulting imprecision in the total amount of vector rotation according to the 1998 paper by Andraka mentioned earlier in this document. According to that reference, the magnitude converges much faster than the phase, and so in applications in which phase accuracy is not critical (which is not uncommon in telecommunications, for example), only about half the usual number of iterations will be required.

Though simple, the method just explains suffers from 1-bit-at-a-time convergence. That is, for n bits of fractional precision, n iterations are needed (for full accuracy both in phase and magnitude), each involving 3 full-precision addition or subtraction. What seems to hinder Volder's circuit down is that it is unobvious how to select an $d_{i-1}$ without first computing $\theta_{i-1}$. But improvements are possible, as we will discuss next.

Many researchers and inventors have improved on or extended Volder's method in various ways over the last few decades. Of these improvements or extensions, one of the most remarkable (and relevant to the result to be presented here) was by Baker, explained in the following paper: P. W. Baker, "Suggestion for a Fast Sine/Cosine Generator," IEEE Transactions on Computers, pp. 1134–1136, Nov. 1976. Stated simply, Baker based his circuit on the observation that after a few initial radix-2 iterations, an entire sequence of $d_{i-1}$'s can be predicted at once, allowing the corresponding iterations to be done simultaneously using carry-save adders. However, Baker did not have a solution for the problem of speeding up the initial iterations. Thus improvements are still possible wherein the initial iterations would also be sped up.

In Vitit Kantabutra's article, "On Hardware for Computing Exponential and Trigonometric Functions," IEEE Transactions on Computers, 45:3, March, 1996, as well as in Vitit Kantabutra's U.S. Patent No. 6,055,553, entitled, "Apparatus for Computing Exponential and Trigonometric Functions," a new CORDIC variant was presented, wherein 8 iterations are lumped into a single iteration that does not take as long as 8 of the original iterations because of the fast, low-precision arithmetic used. This scheme therefore is able to speed up initial iterations (as well as the latter iterations). Due to the need for circuitry to handle 8 "logical" or original iterations in a single "physical" or new iteration, that CORDIC variant is suitable for application in very high-density technologies such as custom CMOS VLSI.

When cost is more of concern, then it would be preferred not to lump so many iterations into one new one. Little work has been done in high-radix CORDIC to date. In M. D. Ercegovac, "Radix-16 Evaluation of Certain Elementary Functions," IEEE Transactions on Computers, C-22:6, June, 1973, radix-16 CORDIC algorithms were presented. However, that paper did not include any details on sine and cosine computation, that is, vector rotation. Ercegovac claimed without going into details that the computations of such functions would be possible using his method. However, it is quite unobvious how (or even whether it was at all possible with his method), because the computation of sine and cosine is quite different from the computation of many other functions using CORDIC: when computing sine and cosine, each iteration gives rise to an amplification factor greater than 1 of the vector $y_i$. In the method proposed by Ercegovac, this factor would NOT be a constant, but would depend on the answer digit chosen in each iteration.

To elaborate further, we note that unlike in the particular version of radix-2 CORDIC discussed above, Ercegovac's method allows an answer digit (which is the equivalent of what we called $d_{i-1}$ above) of zero. This would mean no amplification in iteration i. Thus the total amplification for all iterations would no longer be a constant. For radix-4 CORDIC, many different amplification factors are possible, depending on the magnitude of the particular answer digit picked. The problem of non-constant amplification has been a problem that researchers and inventors have had to deal with in radix-2 CORDIC as well as high-radix CORDIC. In the former case, this problem only occurs if an iteration without any rotation is allowed, that is $d_{i-1}=0$.

To further illustrate the unobviousness of how to perform high-radix CORDIC vector rotation without the problem of non-constant amplification, we next consider more recent prior art than Ercegovac's paper.

E. Antelo, et al. "High-Performance Rotation Architecture," IEEE Transactions on Computers, 46:8, Aug. 1997, designed a family of radix-4 CORDIC rotators. However, their rotators yield non-constant gains to the vector magnitude which must be multiplied by the reciprocal to the respective gain before the final answer is ready. The non-constant gain was due to their use of the answer digit set $\{-2, -1, 0, 1, 2\}$. Lee and Lang, in their paper, "Constant-Factor Redundant CORDIC for Angle Calculation and Rotation," IEEE Transactions on Computers, 41:8, 1,016–1,025, Aug. 1992, designed conventional as well as redundant high-radix CORDIC algorithms. Note that "Redundant" here refers to the technique of storing numbers in redundant notation. This can save addition/subtraction time, but can also increase the time or circuit complexity for deciding each answer digit. We don't use the redundant technique in this paper, and so discussions concerning that technique will be omitted.

The drawback of the techniques presented in Lee and Lang's paper is that they only perform high-radix rotations for the latter half of the iterations; the first half are radix-two rotations. Furthermore their technique requires additional iterations to assure convergence. (As stated earlier, in high precision circuits, the invention presented here also requires additional iterations, but rarely. Also, if the invention is to be used in a pipeline where predictable delay is a must, then we can always avoid long delays by using the invention ONLY in iterations in which such delays never occur, and fall back to a radix-2 rotation stage if radix-4 would cause much more delay than a conventional radix-2 stage.) The reason Lee and Lang allows radix-4 iterations in the latter half is that at that time the arctangent function can be expressed with only one "on" bit due to finite word length. The observation that allows them to accelerate the latter iterations is similar to, but simpler than, that which was used by Baker.

Making the first few iterations higher radix in order to speed up the entire computation is a bigger challenge than speeding up the latter iterations. It is making the first few iterations higher radix that we have found a solution for in this invention.

SUMMARY OF THE INVENTION

An improved radix-4 CORDIC vector rotator circuit iteration stage for initial iterations, using the answer digit set $\{-3, -1, 1, 3\}$ instead of the conventional choices of either $\{-3, -2, -1, 0, 1, 2, 3\}$ or $\{-2, -1, 0, 1, 2\}$, thereby achieving constant magnitude amplification. This invention belongs to the family of rotators that keep data in two's complement binary notation.

The invented circuit stage includes an answer digit decision module, which normally examines only a few digits of the remainder angle $\theta_{i-1}$, thereby saving time when compared to a full-length comparison operation. Very rarely does the answer digit decision process involves examining close to all the digits of the remainder angle.

When only a few digits of the remainder angle needs to be examined, the circuit takes only approximately 20% longer delay than a conventional radix-2 CORDIC stage. Only in the rare instances where a full-length (or almost full length) comparison is required does the radix-4 stage take twice as long as a radix-2 stage. The invented rotator stage can be used either as a pipeline stage or as a single-stage iterative circuit. In the pipeline case we may choose to use the invention in stages where only a few digits of the remainder angle need to be examined, and fall back to a radix-2 stage in iterations where a long comparison would be needed. But when the invention is to be used as a single-stage iterative circuit, long comparisons may be allowed more easily. Both versions have been implemented, and in the single-stage sample implementation, a long comparison is needed only 8.7 times per 1,000 complete vector rotations (not 1,000 iterations) on average.

Therefore in any case the computation of the remainder angle in each iteration is not much slower than its counterpart in a conventional radix-2 rotator, but achieving twice as much work.

The computation of the partially-rotated vector components $x_i$ and $y_i$ employs carry-save adders to distill the four operands into two (using only two full-adder delays) and then add the two with an ordinary carry-propagate adder. Thus this computation, like the computation of the partially-rotated vector output, takes little more time than its counterpart in a conventional radix-2 rotator, but achieving twice as much work.

The following is hereby claimed as the objects and advantages of the invention described herein: to provide a radix-4 CORDIC rotator iterative stage that can perform an initial radix-4 rotation in significantly less average (and sometimes worst-case) time than twice the time taken to perform a radix-2 rotation in the same device technology. The "worst-case" part holds for the very first iteration, and for iterations for which the answer digits of magnitude 1 and those of magnitude 3 can be distinguished from each other by examining significantly fewer bits than the number of bits of precision used for representing angles. (As will be explained later, the invention uses the answer digit set {−3, −1, 1, 3}.

In addition I claim the following objects and advantages: to provide a fast radix-4 CORDIC rotator iteration stage that amplifies its input vector only by a fixed amount independent of the input vector. (The amount of amplification, of course, is dependent on the iteration index.)

DRAWING FIGURES

Note that in FIGS. 1 and 2, more bits may be required in the arithmetic units and registers, especially if the stage is to be used in multiple iterations.

DRAWING REFERENCE NUMERALS

1. Answer digit decider circuit for CORDIC rotator of FIG. 1.
2. Storage (may be hardwired) for providing arctan sum and differences. (Details about these quantities to be given in the description of the invention below.)
3. Decoder for computing the signs of terms 2–4 for adders/subtractors for computing $x_i$ and $y_i$, the vector components.
4. Adder/subtractor with at least N bits of precision, where N is the total precision (integer (including sign) and fraction bits) for computing the angle output, that is, the next angular remainder $\theta_i$.
5. Computer of $x_i$, comprising an adder/subtractor capable of handling four numbers each of at least K bits, where K is the total precision of an input partially-rotated vector component ($x_i$ or $y_i$).
6. Computer of $y_i$, which is the same type of circuit as the previous one.
7. Register of capacity at least N bits for storing the computed angular remainder $\theta_i$.
8. Register of at least K+1 bits for storing the x-component of the computed partially-rotated vector, $x_i$.
9. Register of at least K+1 bits for storing the y-component of the computed partially-rotated vector, $y_i$.
10. Main answer digit decider circuit for CORDIC rotator of FIG. 2.
11. Auxiliary answer digit decider, only needed on rare occasions when the few bits that the main answer digit examines are not sufficient for distinguishing between the answer digit magnitudes 1 and 3.
12. Multiplexer for choosing whether to take the answer digit output from the main or the auxiliary answer digit decider.
13. Storage (may be hardwired) for providing arctan sum and differences. (Details about these quantities to be given in the description of the invention below.)
14. Decoder for computing the signs of terms 2–4 for adders/subtractors for computing $x_i$ and $y_i$, the partially-rotated vector output components.
15. Adder/subtractor of at least N bits, where N is the total precision (integer (including sign) and fraction bits) for computing the angle output, that is, the next angular remainder $\theta_i$.
16. Computer of $x_i$, comprising an adder/subtractor for four numbers, each at least K bits, where K is the total precision of an input partially-rotated vector component ($x_i$ or $y_i$).
17. Computer of $y_i$, which is the same type of circuit as the previous one.
18. Register of at least N bits for storing the computed angular remainder $\theta_i$.
19. Register of at least K+1 bits for storing the x-component of the computed partially-rotated vector, $x_i$.
20. Register of at least K+1 bits for storing the y-component of the computed partially-rotated vector, $y_i$.

DETAILED DESCRIPTION OF PREFERRED EMBODIMENTS

Figure 1:
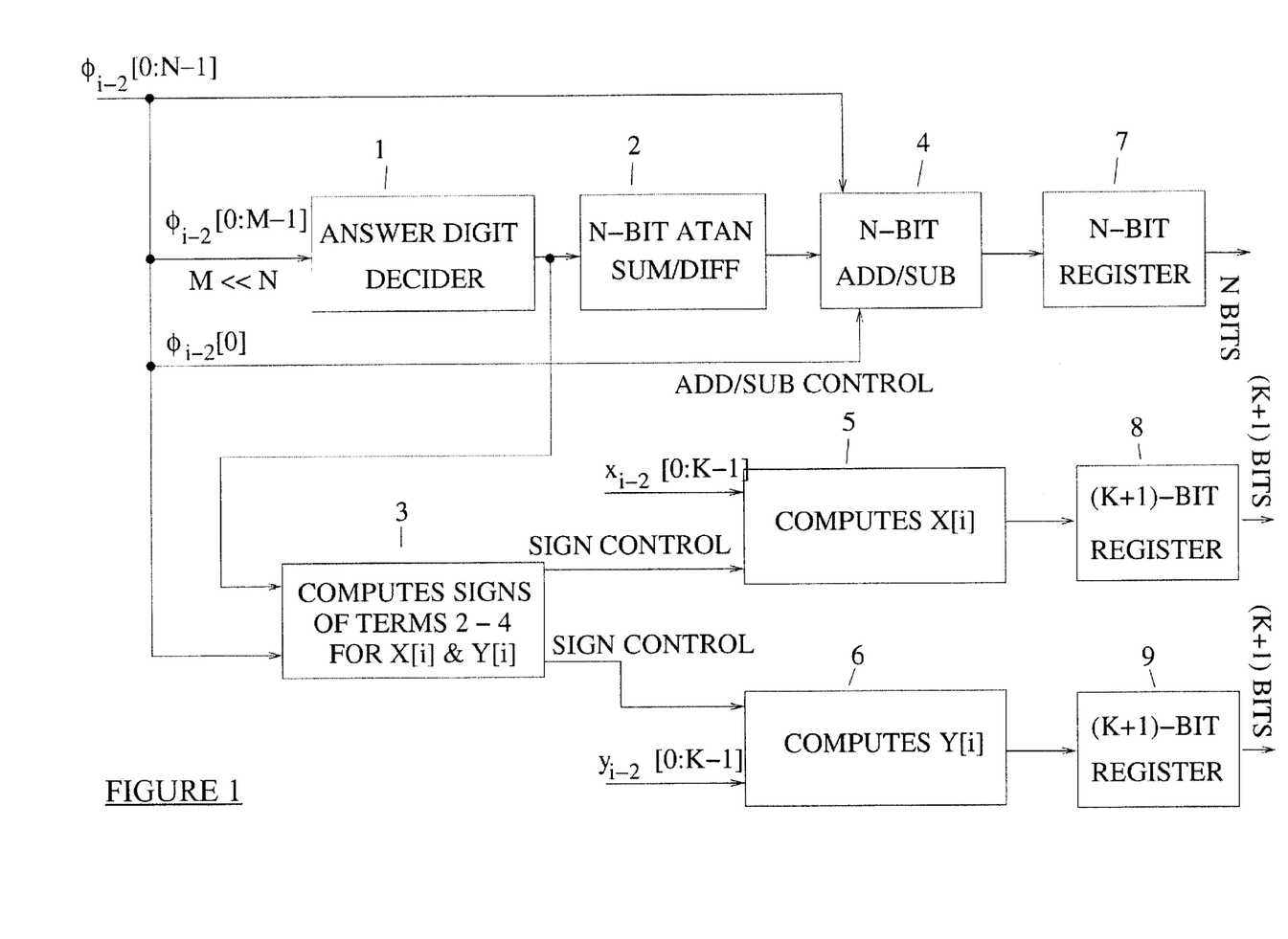
FIG. 1 shows a radix-4 CORDIC circuit stage for vector rotation and for computing sine and cosine, according to the invention. The version shown in this figure has a worst-case delay that is significantly less than twice the delay of a radix-2 CORDIC rotator in the same technology.
Figure 2:
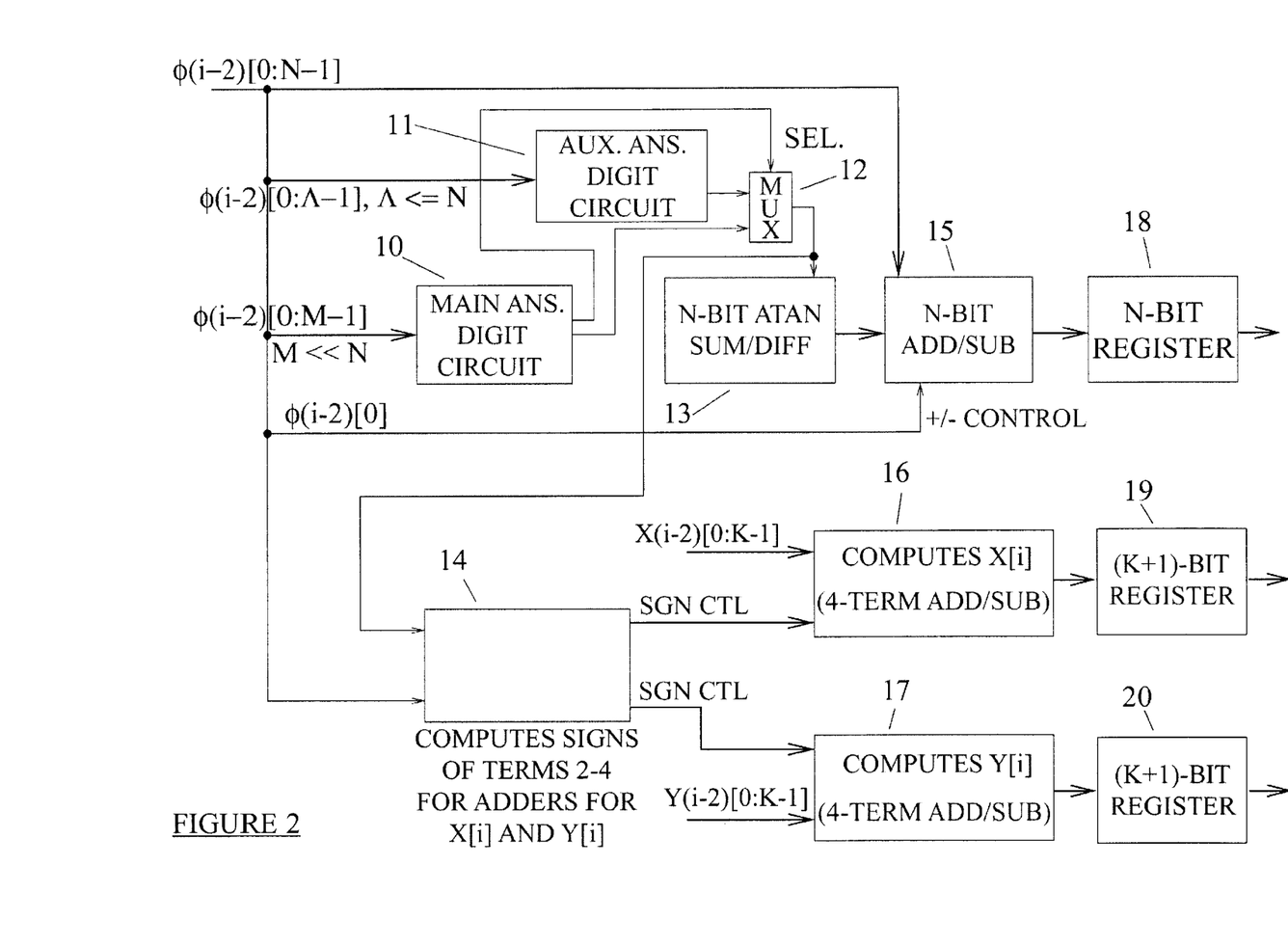
FIG. 2 shows a radix-4 CORDIC circuit stage for vector rotation and for computing sine and cosine, according to the invention. The version shown in this figure has an average-case delay that is significantly less than twice the delay of a radix-2 CORDIC rotator in the same technology, but a worst-case delay is approximately twice the delay of a radix-2 rotator.

There are two versions of the rotator, shown in FIGS. 1 and 2. The two are identical except the latter version once in a while (but rarely) requires an auxiliary circuit to decide the answer digit. We will first study the mathematical principle of the rotators. As stated earlier, Antelo, et al. designed as family of radix-4 CORDIC circuits. However, their circuits has the problem of generating nonconstant amplification factor for the vector. This is due to the fact that they use a answer digit set that includes 0, which represents no rotation at all (as well as no amplification, that is, an amplification factor of 1).

Such nonconstant amplification also happen in radix-2 CORDIC rotators when we use the digit set {−1, 0, 1}, that is, when we include 0 in the digit set. However, this problem was well known to be solved if we only use the digit set {−1, 1}.

We extend that idea to radix-4 CORDIC rotators by using the digit set $\{-3, -1, 1, 3\}$, which has the effect of insuring constant vector amplification. The idea of using this digit set by itself is not new. Lee and Lang, in a previously-referenced paper, also used this digit set, but were not able to apply this digit set to the first half of the iterations.

For this invention we discovered how to apply this digit set to initial iterations, so that now all iterations can be performed in radix-4 using this digit set. Alternatively, we can perform some of the initial iterations in radix-4 (for the iterations in which the worst-case performance is significantly better than two radix-2 stages), and the other initial iterations in radix-2. This way all iterations will have a fast worst-case performance.

All numbers are stored in two's complement binary notation, so when we say that we perform a radix-4 calculation, we mean grouping two adjacent binary digits together. Rewriting equations (5)–(7), but substituting $i-1$ for $i$ yields $$x_{-1} = x_{i-2} - y_{i-2} d_{i-2} 2^{-(i-2)} \tag{8}$$

$$y_{-1} = y_{i-2} + x_{i-2} d_{i-2} 2^{-(i-2)} \tag{9}$$

$$\theta_{-1} = \theta_{i-2} - d_{i-2} \tan^{-1}(2^{-(i-2)}) \tag{10}$$

Combining equations (5) through (10) yields, $$x_i = x_{i-2} - d_{i-2} y_{i-2} 2^{-(i-2)} - d_{i-1} y_{i-2} 2^{-(i-1)} - d_{i-1} d_{i-2} x_{i-2} 2^{-2i+3} \tag{11}$$

$$y_i = y_{i-2} - d_{i-2} x_{i-2} 2^{-(i-2)} + d_{i-1} x_{i-2} 2^{-(i-1)} - d_{i-1} d_{i-2} y_{i-2} 2^{-2i+3} \tag{12}$$

$$\theta_i = \theta_{i-2} - d_{i-2} \tan^{-1} 2^{-(i-2)} - d_{i-1} \tan^{-1} 2^{-(i-1)} \tag{13}$$

Thus computing $x_i$ and $y_i$ involves adding 4 quantities together, which can be done easily using carry-save adders in many technologies, such as Atmel's AT40K FPGA architecture. Equation (13) for computing the new angular remainder $\theta_i$ is easily implemented if we realize that we only have to add or subtract either a sum or a difference of two arctangents to or from $\theta_{i-2}$. We can hardwire $\tan^{-1} 2^{-(i-2)} + \tan^{-1} 2^{-(i-1)}$ and $\tan^{-1} 2^{-(i-2)} - \tan^{-1} 2^{-(i-1)}$, if the rotator stage is part of a pipelined circuit, making $\theta_i$ easy to compute with a single carry-propagate adder of suitable cost and speed, depending on affordability and speed requirements. On the other hand, if the invention is to be used over and over in a iterative loop (non-pipelined rotator) then the arctan sum and differences for all i can be stored in a read-only memory (ROM).

Recall from previous sections that the main new idea presented in this paper is how to compute the answer digit in initial radix-4 stages. Note also that this answer digit must be decoded into different signs for the second through fourth terms in equations (11) and (12). In the radix-2 case with the digit set $\{-1, 1\}$, the answer digit in each iteration is easily decided: The answer is 1 if the remainder is (0 or) positive, and $-1$ otherwise. How difficult is deciding the answer digit in our radix 4 scheme, which is the scheme with the digit set $\{-3, -1, 1, 3\}$? The success of our scheme depends to a good extent on the efficiency, both in time and space, of the determination of the answer digit in each iteration. (Note that the success of our scheme also depends on the rest of the iteration, which consists of adding 4 numbers together, as we shall see. Such addition is "theoretically simple," but requires careful planning & layout for efficient fpga implementation.)

In order to decide the answer digit in each iteration, we must ask the following question: For what range of remainder values is a particular answer digit viable? Here an answer digit is said to be viable if selecting that answer digit leads to a new partial remainder that can be annihilated by the remaining iterations. Thus to study answer digit selection further, one good approach is to calculate the range of remainder values for which each remainder digit is viable.

Define $\rho_{i-2}(d)$ to be the range of values that $\theta_{i-2}$ can take that permit the answer digit d. That is, if $x \in \rho_{i-2}(d)$, then after using the answer digit d on partial remainder $\theta_{i-2} = x$, the new partial remainder $\theta_i$ lies within $[-\Sigma_{k \geq i+1} \tan^{-1} 2^{-k}, -\Sigma_{k \geq i+1} \tan^{-1} 2^{-k}]$. Note that this definition is valid whether or not $\theta_{i-1}$ gets computed physically.

Distinguishing the sign of the answer digit at each iteration is simple: plus if $r_i \geq 0$, minus otherwise. The difficult part is to disguish between the magnitude of 1 and 3. The surprising discovery that leads to simple radix-4 implementation is that there exists a simply-expressable boundary between $\rho_i(1)$ and $\rho_i(3)$, (likewise for $\rho_i(3)$ and $\rho_i(1)$) at least for $i=0$. For custom VLSI implementations, this simplicity also holds for larger values of i. But for slower technologies such as FPGA technologies, this simplicity may not hold well enough at $i=2$. However, all this means is that we would, in such a technology, fall back to radix 2 for one iteration. Then, for the third iteration ($i>3$) onwards, the simplicity may holds again, as it does in a particular CORDIC rotator that we actually implemented, enabling us to resume using radix-4 iterations.

Now we will discuss the method for deciding the answer digit magnitude. The method we will use for distinguishing answer digit magnitudes is based on the observation that there is an overlap between $\rho_i(1)$ and $\rho_i(3)$. For each iteration, we can come up with a number (which we will now call discriminant) that lies in this overlap region, and observe how fast and simple it is to decide whether a given partial remainder is greater or less than this discriminant. In fact, as we will see in some examples below, we don't even have to do straightforward comparison to make that decision. Rather, we can take advantage of the particular bit patterns of sup $\rho_i(1)$ and inf $\rho_i(3)$ and design specialized logic circuitry to make said decision. Lemma 1, below, gives the values of $\rho_i(3)$ and $\rho_i(1)$. We will not prove this lemma here, but the proof is straightforward to those skilled in the art of mathematical proofs involving hardware algorithms.

Lemma 1:

$$\rho_i(3) = \left[ \tan^{-1} 2^{-(i-2)} + \tan^{-1} 2^{-(i-1)} - \sum_{k=i}^{64} \tan^{-1} 2^{-k}, \right. \tag{a}$$

$$\left. \tan^{-1} 2^{-(i-2)} + \tan^{-1} 2^{-(i-1)} + \sum_{k=i}^{64} \tan^{-1} 2^{-k} \right],$$

and, $$\rho_i(1) = \left[ \tan^{-1} 2^{-(i-2)} - \tan^{-1} 2^{-(i-1)} - \sum_{k=i}^{64} \tan^{-1} 2^{-k}, \right. \tag{b}$$

$$\left. \tan^{-1} 2^{-(i-2)} - \tan^{-1} 2^{-(i-1)} + \sum_{k=i}^{64} \tan^{-1} 2^{-k} \right].$$

Figure 3:
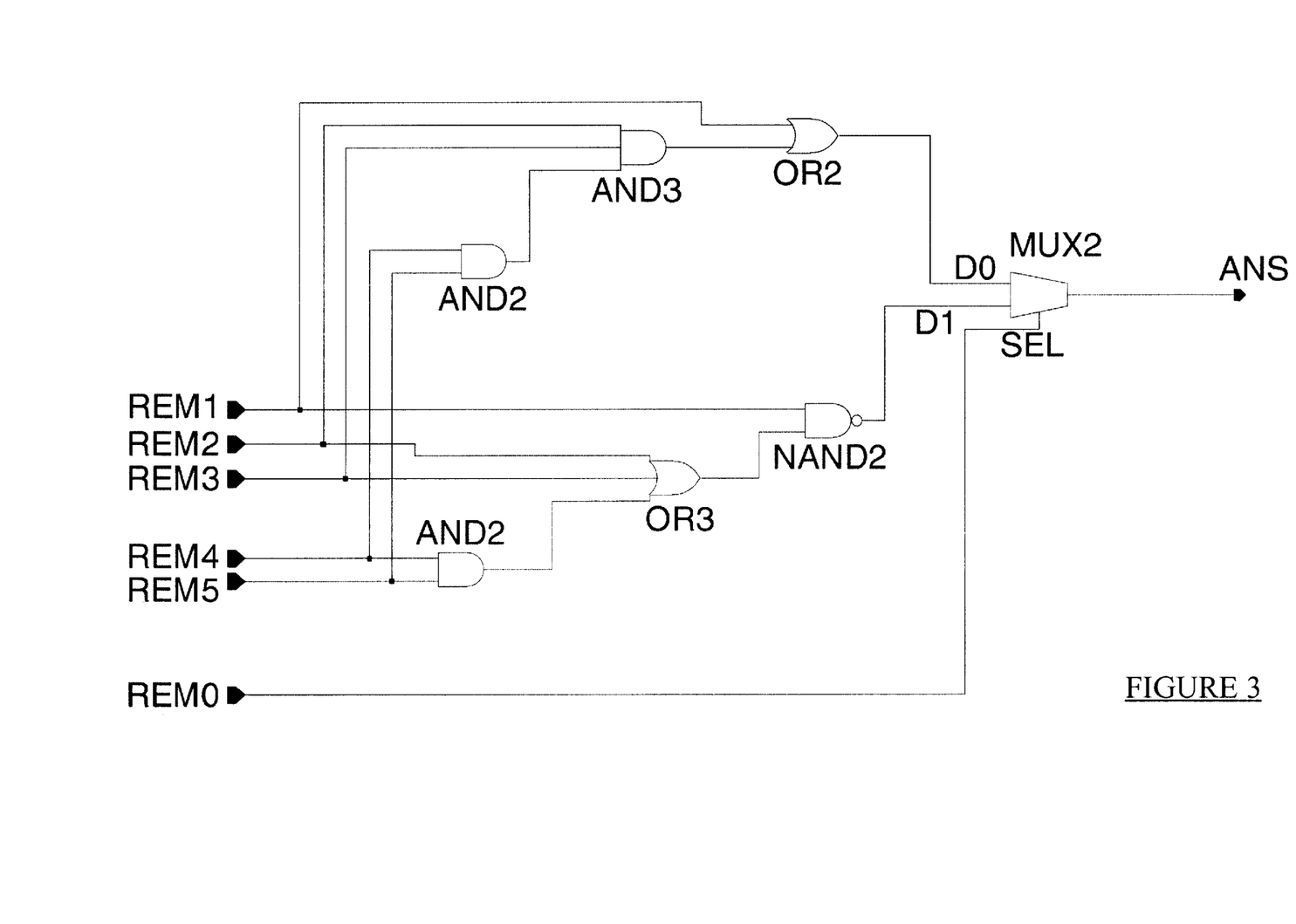
FIG. 3 shows a possible logic circuit for the answer digit decider circuit for the first iteration.

We will illustrate the matter of distinguishing the answer bit magnitudes 1 and 3 by examining our sample FPGA implementation introduced a little earlier. The sample FPGA implementation takes the input angle $\theta_{i-2}$ with 2 integer bits (including the sign bit) and 11 fraction bits. With this number of bits, the formulae from Lemma 1 give sup $\rho_0(3) = 01.10111110010$ and inf $\rho_0(3) = 00.11000001010$, while sup $\rho_0(1) = 00.11010000111$. (These figures have been rounded-to-nearest. This gives us an easy way to distinguish the answer digits 3 and 1. First of all, if the units bit is 1, then we must choose the answer digit 1. But if the units bit is 0, then we check the fraction bits. To do this, we note that .1101 can be used as a discriminant, as it lies in between inf $\rho_0(3)$ and sup $\rho_0(1)$. Thus if a number starts with .11 and if the next two bits are NOT 00, that is, greater than 00, then pick the answer digit 3. Else pick 1. This answer-digit-picking algorithm is very simple as a digital circuit because no true comparisons yielding "greater-than" or "less-than" outputs are needed. Distinguishing between the negative answer digits −1 and −3 is likewise simple and can be done analogously to what we just explained for distinguishing 1 and 3. The details will thus be omitted. Drawing FIG. 3 shows a possible logic circuit for distinguishing answer digit magnitude 1 from 3. In the Figure, REM0 and REM1 are the bits left of the binary point, with REM0 being the sign bit. REM2 through REM5 are the bits with weights $2^{-1}$ through $2^{-4}$ respectively. The output line, ANS, is interpreted as follows: ANS=0 means answer digit magnitude=1, while ANS=1 means answer digit magnitude=3.

Figure 4:
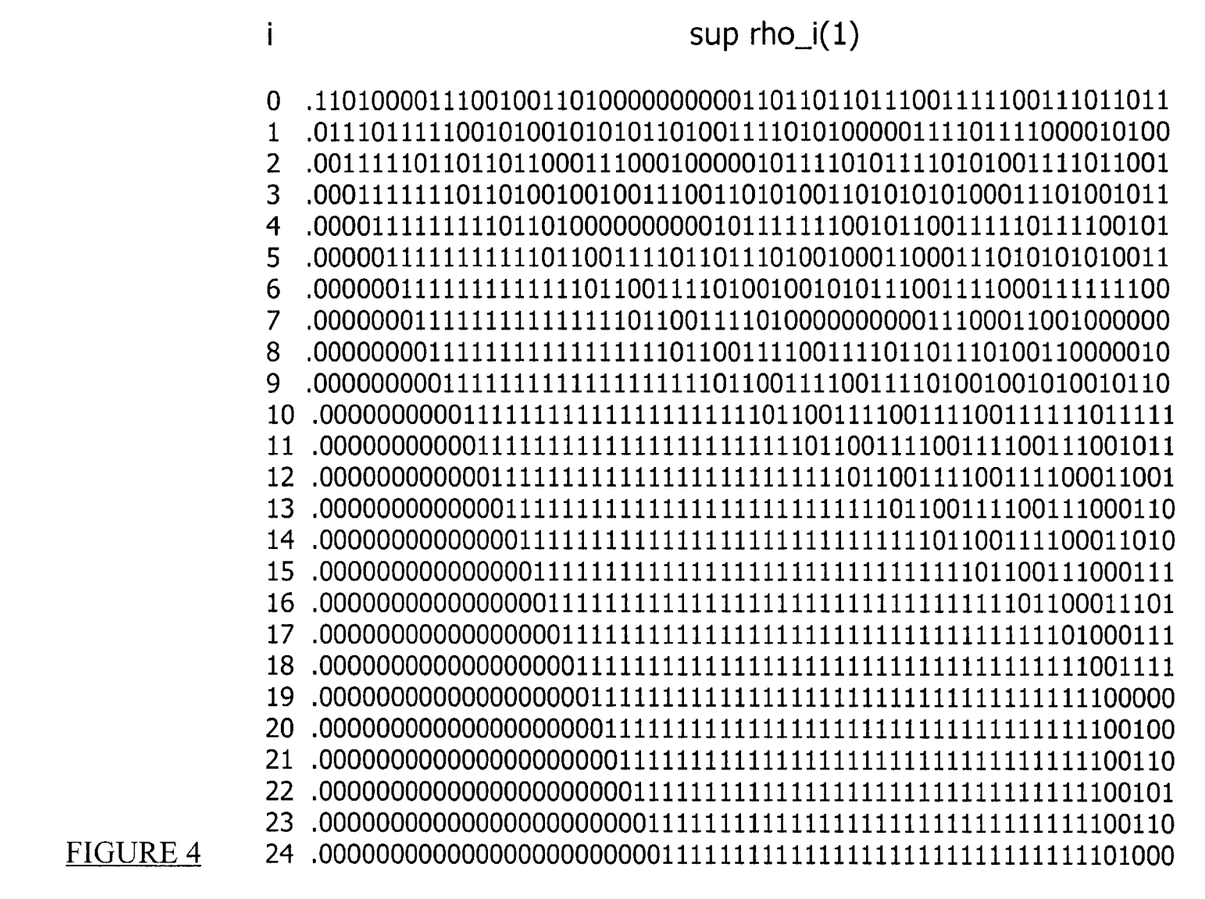
FIGS. 4 and 5 are tables showing sup $\rho_i(1)$ and inf $\rho_i(3)$, respectively, for i running from 0 to 24, with 60 fraction bits.
Figure 5:
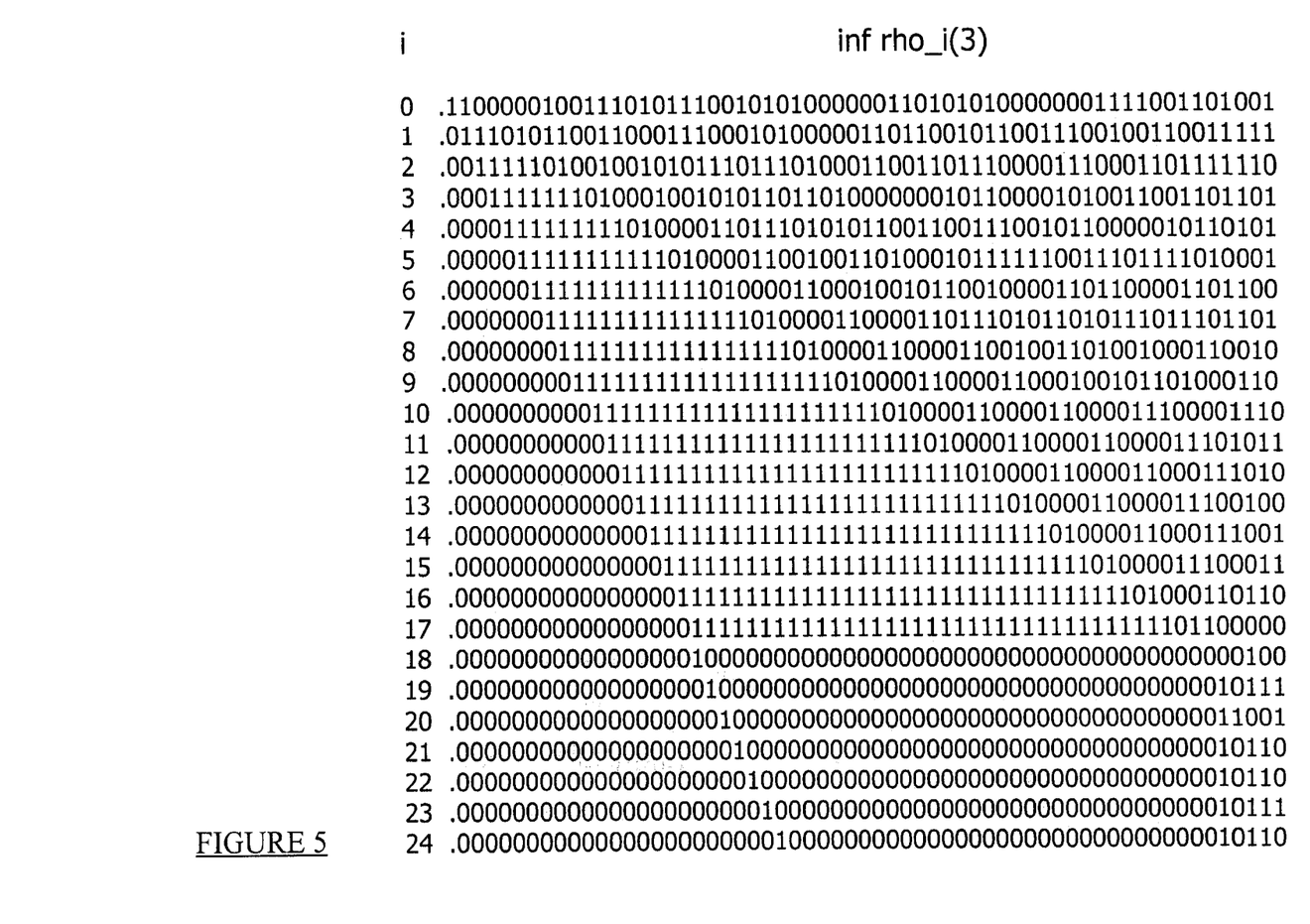

Now we generalize our discussion to allow larger values of i. FIGS. 4 and 5 show sup $\rho_i(1)$ and inf $\rho_i(3)$, respectively, for i running from 0 to 24, with 60 fraction bits. Note that we tabulate odd values of i also because sometimes the most efficient circuit can be obtained by mixing radix-2 and radix-4 stages.

Let us look at the table entries for i=2. We can see that the $10^{th}$ bit of sup $\rho_i(1)$ and inf $\rho_i(3)$ differ. But, as before, we don't have to perform a 10-bit comparison to distinguish the two answer digit magnitudes. Let's just. examine the case in which $\theta_2$ is non-negative. (The negative case is quite similar.) First of all the quarters bit (i.e. the bit with the weight $2^{-2}$ is the highest-weight bit that can be 1. And if it is 1, then the answer digit must be 3 because $\theta_2$ must be outside the range $\rho_i(1)$. Now, if the five consecutive bits starting with the eighth bit and extending to the right are all 1's, and if the 3 consecutive bits immediately to the right of that form the binary string 011 or a string that represents a greater number (100, 101, 110, or 111), then the answer digit is 3. Otherwise the answer digit is 0.

It is important to note that, although we have discussed a new type of "CORDIC circuit stage," the same structure can also be implemented as a single-stage iterative loop. In this case we will need a few extra bits (which is not difficult for those skilled in the art to determine the exact number) in the arithmetic units and registers because the vector is amplified slightly after each iteration, and also because the more iterations we perform, the more round-off error occur and has to be countered by a few extra guard bits. Note also that in an implementation, whether pipelined or not, after the equivalent of a radix-2 iteration an extra bit on the left becomes insignificant. So after a radix-4 iteration, a left-shift of 2 places can and should be performed to retain maximum precision.

I claim:

1. A digital radix-4 CORDIC rotator circuit stage operating on an input angle $\theta_{i-2}$, i−2≧0, represented in two's complement binary with N bits of precision, and on an input vector ($x_{i-2}$, $y_{i-2}$), presented in two's complement binary with K bits of precision, comprising:

(a) an answer digit decider circuit, said answer digit decider circuit only examining M bits of $\theta_{i-2}$ for some M<<N, (b) a read-only memory for storing arctan sum and difference, that is, $\tan^{-1}2^{-(i-1)} \pm \tan^{-1}2^{-(i-2)}$, said read-only memory basing its selection between $\tan^{-1}2^{-(i-1)} + \tan^{-1}2^{-(i-2)}$ and $\tan^{-1}2^{-(i-1)} - \tan^{-1}2^{-(i-2)}$ upon whether the answer digit decider circuit in item (a) indicates an answer digit magnitude of 3 or 1, respectively, (c) a decoder circuit for computing signs of terms two, three, and four for the two four-operand adder/subtractors of parts (e) and (f) for computing the partially-rotated vector output components $x_i$ and $y_i$, said decoder taking as input the sign bit of the input angle $\theta_{i-2}$ as well as the output of the answer digit decider circuit in part (a), (d) an adder/subtractor for adding or subtracting the input angle $\theta_{i-2}$ and the arctan sum or difference, (e) a four-input adder/subtractor, that is, a circuit capable of computing the number A±B±C±D, where A, B, C, and D are two's complement binary numbers, for computing $x_i$, the x component of the partially-rotated vector output ($x_i$, $y_i$), and, (f) a four-input adder/subtractor, that is, a circuit capable of computing the number A±B±C±D, where A, B, C, and D are two's complement binary numbers, for computing $y_i$, the y component of the partially-rotated vector output ($x_i$, $y_i$).

2. The CORDIC rotator circuit stage of claim 1 that also comprises:

(a) a register for storing the output angle $\theta_i$, and, (b) registers for storing the x and the y components of the output vector ($x_i$, $y_i$).

3. A digital radix-4 CORDIC rotator circuit stage operating on an input angle $\theta_{i-2}$, i−2≧0, represented in two's complement binary with N bits of precision, and on an input vector ($x_{i-2}$, $y_{i-2}$), presented in two's complement binary with K bits of precision, comprising:

(a) a main answer digit decider circuit that only examines M bits of $\theta_{i-2}$ for some M<<N, said circuit having an answer digit magnitude output bit and another output bit to indicate whether or not said answer digit magnitude output bit is valid, (b) an auxiliary answer digit decider circuit, to be used only when circuit in item (a) is incapable of deciding the answer digit magnitude, said auxiliary answer digit decider circuit examining A bits of the input angle $\theta_{i-2}$, for some A<N.

(c) a multiplexer for selecting between the answer digit output of the main and the auxiliary answer digit decider circuit, said multiplexer taking as its select input the latter-cited output bit of the main answer digit decider circuit in item (a), (d) a read-only memory for storing arctan sum and difference, that is, $\tan^{-1}2^{-(i-1)} \pm \tan^{-1}2^{-(i-2)}$, said read-only memory basing its selection between $\tan^{-1}2^{-(i-1)} + \tan^{-1}2^{-(i-2)}$, and $\tan^{-1}2^{-(i-1)} - \tan^{-1}2^{-(i-2)}$, upon whether the output bit of the multiplexer in item (c) indicates an answer digit magnitude of 3 or 1, respectively, (e) a decoder circuit for computing signs of terms two, three, and four for the two four-operand adder/subtractors of parts (e) and (f) for computing the partially-rotated vector output components $x_i$ and $y_i$, said decoder taking as input the sign bit of the input angle $\theta_{i-2}$ as well as the output of the multiplexer in part (c), (f) an adder/subtractor for adding or subtracting the input angle $\theta_{i-2}$ and the arctan sum or difference, (g) a four-input adder/subtractor, that is, a circuit capable of comput- ing the number A±B±C±D, where A, B, C, and D are two's complement binary numbers, for computing $x_i$, the x component of the partially-rotated vector output $(x_i, y_i)$, and, (h) a four-input adder/subtractor, that is, a circuit capable of com- puting the number $A\pm B\pm C\pm D$, where A, B, C, and D are two's complement binary numbers, for computing $y_i$, the y component of the partially-rotated vector output $(x_i, y_i)$, 4. The CORDIC rotator circuit stage of claim 3 that also comprises:

(a) a register for storing the output angle $\theta_i$, and, (b) registers for storing the x and the y components of the output vector $(x_i, y_i)$.

* * * * *